(12) United States Patent
Schneider et al.

(10) Patent No.: US 7,811,175 B2
(45) Date of Patent: Oct. 12, 2010

(54) TORQUE TRANSMISSION DEVICE

(75) Inventors: Franz Schneider, Munich (DE); Ekkehard Gorski, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/256,294

(22) Filed: Oct. 22, 2008

(65) Prior Publication Data
US 2009/0042657 A1    Feb. 12, 2009

Related U.S. Application Data

(63) Continuation of application No. PCT/EP2007/004989, filed on Jun. 5, 2007.

(30) Foreign Application Priority Data
Jul. 11, 2006    (DE) .................. 10 2006 032 312

(51) Int. Cl.
F16D 3/64    (2006.01)
(52) U.S. Cl. .................... 464/76; 464/82; 464/162
(58) Field of Classification Search ............. 464/74–76, 464/82, 83, 162, 167
See application file for complete search history.

(56) References Cited

U.S. PATENT DOCUMENTS

| | | | | |
|---|---|---|---|---|
| 2,199,926 A | * | 5/1940 | Swennes | 464/75 |
| 2,956,187 A | * | 10/1960 | Wood | |
| 3,075,369 A | * | 1/1963 | Swire | |
| 3,183,684 A | * | 5/1965 | Zeidler | 464/162 X |
| 3,383,126 A | | 5/1968 | Salvatori et al. | |
| 3,808,838 A | | 5/1974 | Bowen et al. | |
| 3,933,012 A | * | 1/1976 | Ketchum | 464/74 X |
| 4,084,410 A | * | 4/1978 | Michon | 464/82 |
| 4,162,619 A | * | 7/1979 | Nixon, Jr. | 464/75 X |
| 4,269,043 A | | 5/1981 | Kizu et al. | |
| 5,243,874 A | | 9/1993 | Wolfe et al. | |
| 5,460,574 A | | 10/1995 | Hobaugh | |
| 5,507,203 A | | 4/1996 | Audibert et al. | |
| 5,630,758 A | * | 5/1997 | Rivin | 464/74 |
| 6,510,756 B2 | * | 1/2003 | Aota | 464/167 X |

FOREIGN PATENT DOCUMENTS

DE    75 41 299 U    4/1976

(Continued)

OTHER PUBLICATIONS

International Search Report dated Sep. 13, 2007 w/English translation (four (4) pages).

(Continued)

*Primary Examiner*—Greg Binda
(74) *Attorney, Agent, or Firm*—Crowell & Moring LLP

(57) ABSTRACT

A torque transmission device is provided with an outer tube having a non-circular internal circumference and an inner tube having a non-circular external circumference inserted into the outer tube. The two tubes have a predefined rotational clearance as the result of a gap formed between the internal and the external circumference. At least one elastic wire cushion-like element is provided in the gap between the two tubes. The two tubes are displaceable in relation to one another, in the longitudinal direction of the tube, in such a way as to make possible length compensation, even under load.

7 Claims, 2 Drawing Sheets

FOREIGN PATENT DOCUMENTS

| | | |
|---|---|---|
| DE | 198 24 477 A1 | 12/1999 |
| DE | 694 19 531 T2 | 1/2000 |
| DE | 10 2004 051 340 A1 | 6/2006 |
| EP | 0 145 572 A1 | 6/1985 |
| EP | 0 893 613 A1 | 1/1999 |
| EP | 1 544 495 A2 | 6/2005 |
| GB | 1 264 016 | 2/1972 |
| JP | 5-157119 A * | 6/1993 |
| WO | WO 01/76931 A1 | 10/2001 |

OTHER PUBLICATIONS

German Search Report dated Apr. 27, 2007 w/English translation of pertinent portion (nine (9) pages).

* cited by examiner

TORQUE TRANSMISSION DEVICE

CROSS-REFERENCE TO RELATED APPLICATIONS

This application is a continuation of PCT International Application No. PCT/EP2007/004989, filed Jun. 5, 2007, which claims priority under 35 U.S.C. §119 to German Application No. 10 2006 032 312.2, filed Jul. 11, 2006, the entire disclosures of which are expressly incorporated by reference herein.

BACKGROUND AND SUMMARY OF THE INVENTION

The present invention relates to a torque transmission device having an outer tube with a noncircular internal circumference and an inner tube with a noncircular external circumference inserted into the outer tube, a gap being provided between the internal circumference and the external circumference. The two tubes have a predefined rotational play, and at least one elastic wire-cushion-type element is arranged in the gap between the two tubes.

A torque transmission device of the above-mentioned type is known from German patent document DE 10 2004 051 340 A1.

It is an object of the invention to modify the torque transmission device known from German patent document DE 10 2004 051 340 A1 which, in the case of a relative rotation of the two tubes, in a first angular sector, has a relatively flat characteristic curve and, adjoining the latter, an area of a pronounced characteristic curve progression, such that the torque transmission device is suitable for additional, in particular general, applications in the field of mechanical engineering.

This object is achieved by a torque transmission device having an outer tube with a noncircular internal circumference and an inner tube with a noncircular external circumference inserted into the outer tube, a gap being provided between the internal circumference and the external circumference. The two tubes have a predefined rotational play, and at least one elastic wire-cushion-type element is arranged in the gap between the two tubes. The two tubes are displaceably arranged with respect to one another in a longitudinal direction of the tubes such that they permit a length compensation also when subjected to a torque load.

Advantageous embodiments and further developments of the invention are described and claimed herein.

The invention is based on the torque transmission device known from German patent document DE 10 2004 051 340 A1, which has an outer tube with a noncircular internal circumference and an inner tube with a noncircular external circumference arranged in the outer tube. It is explicitly pointed out that, in the following description and claims, the term "inner tube" is to be understood to also apply to a rod; that is, to a component having a solid cross-section. "Non-circular" may also mean, for example, oval, polygonal, "tooth-type", or the like. The two tubes may, for example, have a polygonal cross-section with the same number of angles. Square or triangular cross-sections, for example, are also contemplated.

A gap is provided between the two tubes. The gap may extend in the "circumferential direction" of the two tubes. As a result, the two tubes have a certain relative rotating play. Thus, for example, an "internal toothing" may be provided on the internal side of the outer tube, and an "external toothing" engaging in the "internal toothing" may be provided on the external side of the inner tube, the "toothings" having a tooth play in the circumferential direction, by which the "gap" is formed. In addition, a gap can be provided which extends in the radial direction between the two tubes.

At least one elastic wire-cushion-like element is arranged in the gap. The wire-cushion-like element provides the torque transmission device with compliance and damping characteristics and, thereby, reduces the transmission of torsional vibrations from one tube to the other or vice versa.

The term "wire-cushion-like element" should be understood in an extremely broad fashion. The wire-cushion-like element may, for example, have the structure of a braiding, a texture, or a knit. It may be made of spring wire or of a plurality of spring wires. The individual spring wires may have identical or different shapes. They may be equipped in sections or completely with a coating, for example, an elastomer, a rubberizing or the like, which provides the wire-cushion-like element with a high "internal" friction, if that is desirable. As a result, the damping characteristic can be influenced in a targeted manner with respect to the specific application.

In the case of small relative rotating angles, the at least one wire-cushion-like element has a low "spring hardness". This means that the characteristic torsion curve of the "tube-in-tube arrangement" is flat in the case of low relative torsion angles. When the at least one wire-cushion-like element is completely compressed; that is, when it moves to "block", the characteristic torsion curve rises steeply. Such a characteristic curve feature is advantageous for various applications.

Based on this type of arrangement which, for the most part, is known from the above-mentioned German patent document DE 10 2004 051 340A1, the invention consists of designing the torque transmission device such that, in addition to the degree of rotational freedom in the circumferential direction of the two tubes, the torque transmission device permits a "length compensation" in a longitudinal direction of the tube, specifically also during its operation, that is, also when subjected to a "torque load", which is necessary in many uses. When correspondingly dimensioned, this type of a torque transmission device can be used, for example, in the drive train of a vehicle, in a steering drive, or in a plurality of other machine construction applications. In this case, the tubes of the torque transmission device are arranged such that, also when they are subjected to "a load", that is, when torque is transmitted from one tube by way of the at least one wire-cushion-like element to the other tube, they are mutually displaceable in the longitudinal tube direction.

This is preferably achieved in that the internal circumference of the outer tube and the exterior circumference of the inner tube, at least over a certain tube length, each have a cross-section that remains essentially constant, which permits a mutual displacement of the two tubes, that is, a "sliding" of one tube on the other tube in the longitudinal tube direction. For this purpose, it is essential that circumferential sections of the inner tube which, when the two tubes are rotated, cause a torque transmission, are displaceable in correspondingly long "recesses" of the outer tube extending in the longitudinal direction of the tube. If the circumferential sections of the inner tube, which cause a torque transmission, each have a length "a" and if the torque transmission device is to permit a displacement path of the length "s", the recesses in the outer tube, in which the corresponding circumferential sections of the inner tube are displaceable, should at least have a length "a+s".

For some uses, it may also make sense to provide a "damped end stop". Thus, for example, the axial ends of the recesses provided in the outer tube may have a conical design; that is, they may be designed to be tapering radially and/or in the circumferential direction. This may make sense, for example, when the torque transmission device is used in the drive shaft line of a vehicle. The drive shaft may be compressed in the event of a crash. A torque transmission device integrated in the drive shaft line would then be maximally pushed together, specifically farther than would be the case in normal operating situations. The torque transmitting sections of the inner tube would strike in the axial direction against the axial ends of the recesses provided in the outer tube. In order to prevent this from taking place abruptly, it may be meaningful to provide the axial ends of the recesses with a tapering design. As an alternative or in addition, damping elements, such as wire-cushion-type damping elements, rubber buffers, or the like, may also be provided for this purpose which, in such a situation, would at least to a certain extent dampen the "impacting" of the torque transmitting sections of the inner tube on the axial ends of the recesses of the outer tube.

According to a further development of the invention, it is provided that the at least one wire-cushion-like element is fixed on one of the two tubes in the axial direction. As a result, it is ensured that the at least one wire-cushion-like element is always situated in a clearly defined position. The at least one wire-cushion-like element may, for example, be fixed on the internal circumference of the outer tube or on the external circumference of the inner tube in the longitudinal direction of the tube. It may correspondingly be provided that the wire-cushion-like element is displaceable on the external side of the inner tube or on the internal side of the outer tube in the longitudinal direction of the tube. An axial fixing in each of the two directions can be achieved, for example, by use of a tube step, a shaft nut, a retaining ring, etc.

The wire cushion and the external side of the inner tube and the internal side of the outer tube, respectively, are preferably coordinated with one another such that a coefficient of friction is obtained that is as low as possible, particularly in the direction of the degree of displacement freedom, that is, in the longitudinal direction of the tube. It may also, for example, be provided that the wire-cushion-like element and the external side of the inner tube or the internal side of the outer type are provided with a low-friction coating. In addition, the wire-cushion-like element and the external side of the inner tube or the internal side of the outer tube, respectively, may be provided with a lubricant, such as a lubricating grease.

For minimizing axial friction, that is, for minimizing stick-slip effects during the axial displacement of the two tubes, the two tubes and the at least one wire-cushion-like element should be mutually coordinated such that, at least in operating conditions in which no torque or only a slight torque is transmitted, the at least one wire-cushion-like element is essentially free of radial tension and transmits hardly any radial forces (or only low radial forces) between the internal circumference of the outer tube and the external circumference of the inner tube.

Because of the low coefficient of friction between the at least one wire-cushion-like element and the external circumference of the inner tube or the internal circumference of the outer tube, there are hardly any stick-slip effects, which is important for a large number of usage possibilities, for which an axial length compensation under a torque load and a springing or damping of torsional vibrations has to take place.

In principle, it is also contemplated that at least one wire-cushion-like element is axially fixed on the external circumference of the inner tube as well as on the internal circumference of the outer tube. However, in this case, the displacement path of the two tubes is limited to the "axial elasticity path" of the wire-cushion-like element.

According to a further development of invention, the two tubes are centered relative to one another. A centering can be achieved, for example, in that circumferential sections of the internal circumference of the outer tube and/or circumferential sections of the external circumference of the inner tube are circular, in which case, the internal circumference of the outer tube in such areas rests "flatly" against the external circumference of the inner tube and can slide thereon similar to a plain thrust bearing.

As an alternative, it may be provided that only one of the two tubes has a circular design in individual circumferential sections, and the respective other tube is provided with assigned bead-type indentations or bulges which rest against these circular sections of the other tube.

In the gap between the two tubes, exactly a single elastic wire-cushion-like element may be arranged, which extends in the manner of a collar or a hose around the external circumference of the inner tube. Instead of a single hose-type "wire cushion", a "knit band" may also be wound directly on the inner tube. As an alternative, two or more block-type or ring-segment-type wire-cushion-like elements, distributed in the circumferential direction and/or longitudinal direction of the tube, may be arranged in the gap between the two tubes. In the case of ring-type "wire cushion elements", these may be pressed together to different degrees along the circumference, whereby the characteristic curve of the torque transmission can be optimized.

For illustrating a defined elasticity behavior, in the case of several elastic wire-cushion-like elements, these may each have different characteristic elasticity curves. The individual wire-cushion-like elements may, for example, have different shapes and/or may be made of different materials.

As indicated above, multiple shapes of the tube cross-section are contemplated. As an alternative to oval, polygonal, or toothed tube cross-sections, tubes with several beads, which are mutually spaced in the circumferential direction, can be used. The beads extend in the longitudinal direction of the tube and may, for example, be produced by internal high-pressure forming of the tubes.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
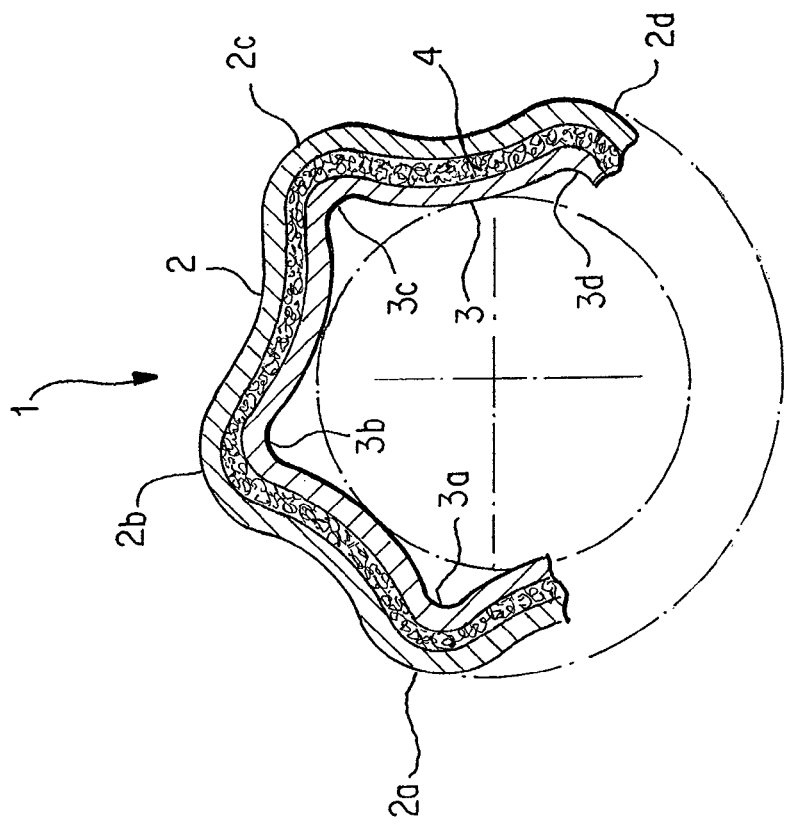
FIG. 1 is a cross-sectional view of a tube-in-tube shaft according to the invention.

FIG. 1 illustrates a tube-in-tube shaft 1 having an outer tube 2 and an inner tube 3 inserted in the outer tube 2. The outer tube 2 and the inner tube 3 are shaped essentially complementary to one another. The two tubes 2, 3 have several bead-type bulges 2a-2d and 3a-3d, respectively, which are mutually spaced in the circumferential direction and which each extend in the longitudinal direction of the tube, that is, perpendicular to the plane of projection. The bead-type bulges 3a-3b of the inner tube 3 engage in the bead-type bulges 2a-2d of the outer tube 2. As illustrated in FIG. 1, a gap is provided between the outer tube 2 and the inner tube 3, in which gap an elastic wire-cushion or an elastic "wire sleeve" 4 is arranged, which is adapted to the shape of the gap.

Figure 2:
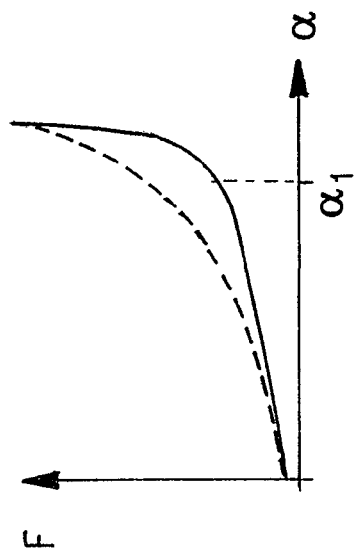
FIG. 2 is a graphical representation of the course of the characteristic curve of the tube-in-tube shaft of FIG. 1.

Because of the gap between the two tubes 2, 3, the two tubes 2, 3 can be rotated relative to one another about a predefined angle. In this case, the wire-cushion is compressed in some areas and is stretched in other areas. In the case of relative rotational angles, which are smaller than al (compare the force F versus angle or graph of FIG. 2), the characteristic curve shown in solid line has a relatively flat course. In the case of a relative rotational angle which is in the range of al, the wire-cushion 4 is almost completely compressed. This means that in the range of al, the wire-cushion changes to "block", which results in a considerable ascent of the characteristic curve compared to a normal characteristic wave shown in dashed line where the force increases proportionally to the rotational angle.

In the embodiment illustrated in FIG. 1, a single elastic wire-cushion-like element is provided, which extends around the inner tube 3 in the manner of a collar.

Figure 3:
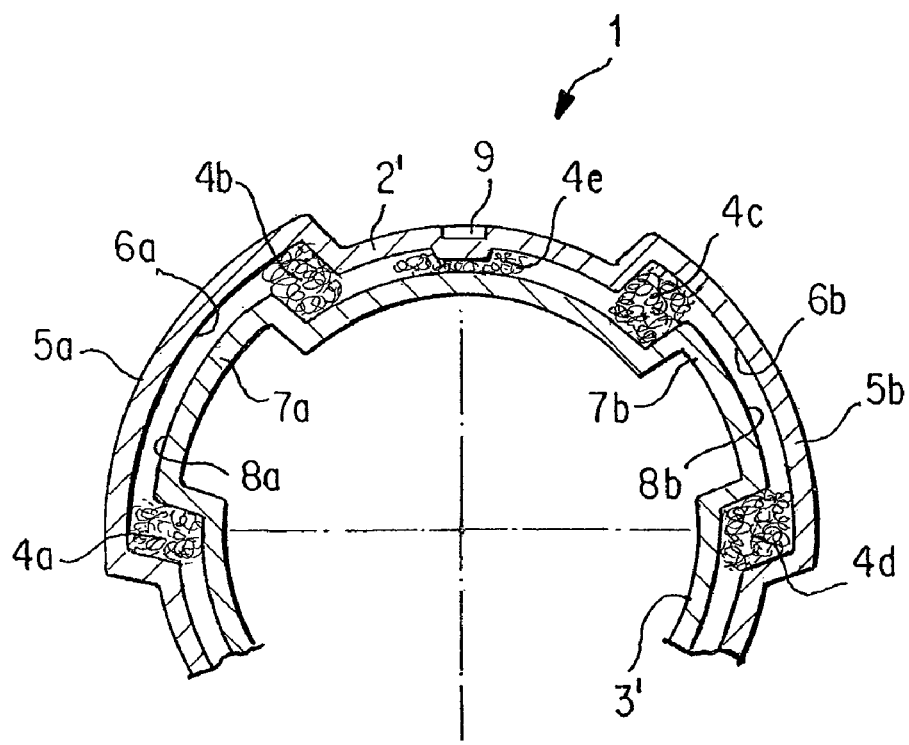
FIG. 3 is a cross-sectional view of another embodiment of a tube-in-tube shaft according to the invention.

FIG. 3 illustrates an embodiment of a tube-in-tube arrangement 1, where the outer tube 2' is provided with several pocket-type bulges 5a, 5b, which are mutually spaced in the circumferential direction and whose radial internal sides 6a, 6b are essentially circular viewed in the circumferential direction. The inner tube 3' is provided with a corresponding number of pocket-type bulges 7a, 7b whose radial external sides 8a, 8b also have circular shapes. As illustrated in FIG. 3, viewed in the circumferential direction, the pocket-type bulges 7a, 7b extend over a shorter circumferential section than the pocket-type bulges 5a, 5b, which permits a relative rotation of the outer tube 2' with respect to the inner tube 3'. The outer tube 2' and the inner tube 3' may be such that the pocket-type bulges 7a, 7b can slide essentially without play in the pocket-type bulges 6a, 6b, which ensures a centering of the inner tube 3' in the outer tube 2'.

Figure 4:
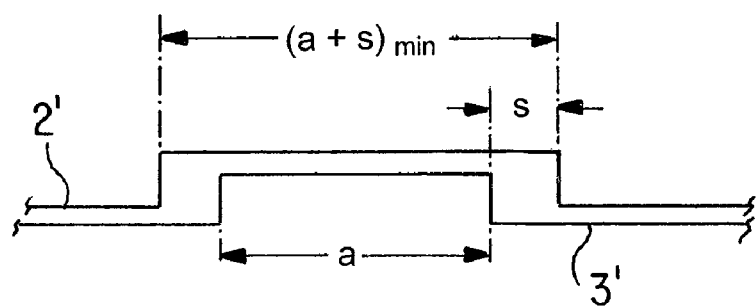
FIG. 4 is a partial cross-sectional view taken transverse through a pocket-type bulge of FIG. 3.

Referring to FIG. 4, in order to achieve displacement of the outer tube 2' with respect to the inner tube 3', it is provided that, viewed in the longitudinal (or axial) direction of the tubes 2', 3', that is, perpendicular to the plane of projection, the pocket-type bulges 5a, 5b are longer than the pocket-type bulges 7a, 7b of the inner tube 3'. If the pocket-type bulges 7a, 7b of the inner tube 3' each have a length "a" and if the torque transmission device is to permit a displacement path of the length "s", the pocket-type bulges 5a, 5b should have at least a length "a+s" in the axial direction of the tubes, that is perpendicular to the plane of projection. A corresponding situation naturally also applies to the embodiment illustrated in FIG. 1.

As illustrated in FIG. 3, elastic wire-cushion-type elements 4a-4d are, in each case, arranged in the gaps between the pocket-type bulges 7a, 7b and the pocket-type bulges 5a, 5b. The elastic wire-cushion-type elements 4a-4d cushion and dampen the rotating movement or torsional vibration during a relative rotation of the two tubes 2', 3'.

In addition, in the case of the embodiment illustrated here, a further wire-cushion-type element 4e is arranged in the area between two pocket-type bulges 7a, 7b of the inner tube 3' following one another in the circumferential direction, in the area between the external circumference of the inner tube 3' and the internal circumference of the outer tube 2'. The additional wire-cushion-like element 4e is pressed together here almost "to a block". As a result of one or more such wire-cushion-type elements (pressed to form a block) arranged in a distributed manner along the circumference, the inner tube 3' can be centered in the outer tube 2'. The "pressing to a block" can take place subsequently by the impressing of a bead 9 from the external side of the outer tube 2', which is very cost-effective.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A torque transmission device, comprising:
an outer tube having an outer circumference and an internal circumference with adjacent pairs of spaced sides bulging radially outwardly relative to the outer circumference between each of the pairs of spaced bulging sides, each pair defining therebetween an annular surface located radially outwardly of an annular surface between the adjacent pairs of the spaced bulging sides;
an inner tube having an external circumference, said inner tube being arranged within the outer tube and having adjacent pairs of spaced sides corresponding in number and shape to the outer tube spaced sides and bulging radially outwardly toward the outer tube, each pair defining therebetween an annular surface located radially outwardly of an annular surface between the adjacent pairs of the spaced bulging sides so that a gap is provided between the internal circumference of the outer tube and the external circumference of the inner tube, with said inner and outer tubes having a predefined rotational play;
spaced elastic wire-cushion-type elements arranged in the gap between the radially extending sides of the inner and outer tubes; and
wherein an external circumference of the inner tube and an internal circumference of the outer tube are operatively configured to define a relative axial displacement path to provide a length compensation when the torque transmission device is subjected to a torque load.

2. The torque transmission device according to claim 1, wherein internal circumference of the outer tube and the external circumference of the inner tube have respective cross-sections that are substantially constant over at least a defined tube length.

3. The torque transmission device according to claim 1, wherein the wire-cushion-type elements are arranged to be axially displaceable along the external circumference of the inner tube or the internal circumference of the outer tube direction.

4. The torque transmission device according to claim 1, wherein the elastic wire-cushion-like elements are sized to be substantially free of radial tension and transmit only minimal radial forces between the outer tube and the inner tube when minimal torque is being transmitted.

5. The torque transmission device according to claim 1, wherein sections of the outer tube internal circumference and of sections of the inner tube external circumference are circular segments.

6. The torque transmission device according to claim 1, further comprising means for mutual centering of the outer and inner tubes.

7. The torque transmission device according to claim 1, wherein at least two of the elastic wire-cushion-type elements have different characteristic elasticity curves.

* * * * *